(12) United States Patent
Ewanchuk et al.

(10) Patent No.: US 10,977,273 B2
(45) Date of Patent: Apr. 13, 2021

(54) ELECTRONIC DEVICE AND METHOD OF MANAGING DATA TRANSFER

(71) Applicant: BlackBerry Limited, Waterloo (CA)

(72) Inventors: Andrew John Ewanchuk, Baden (CA); Ronesh Puri, Dundas (CA); David Andrew Brown, Waterloo (CA)

(73) Assignee: BlackBerry Limited, Waterloo (CA)

( * ) Notice: Subject to any disclaimer, the term of this patent is extended or adjusted under 35 U.S.C. 154(b) by 443 days.

(21) Appl. No.: 15/226,755

(22) Filed: Aug. 2, 2016

(65) Prior Publication Data

US 2018/0039682 A1    Feb. 8, 2018

(51) Int. Cl.
*G06F 16/27* (2019.01)
*H04L 29/08* (2006.01)
*H04L 29/06* (2006.01)
*H04W 88/02* (2009.01)

(52) U.S. Cl.
CPC .............. *G06F 16/27* (2019.01); *H04L 67/06* (2013.01); *H04L 67/1095* (2013.01); *H04L 67/42* (2013.01); *H04W 88/02* (2013.01)

(58) Field of Classification Search
CPC ... G06F 17/30575; G06F 16/27; H04L 67/06; H04L 67/42; H04W 88/02
See application file for complete search history.

(56) References Cited

U.S. PATENT DOCUMENTS

| | | | |
|---|---|---|---|
| 7,515,909 B2* | 4/2009 | Jain | H04L 43/0829 455/436 |
| 7,860,962 B2* | 12/2010 | White | H04L 29/06027 709/223 |
| 2005/0033863 A1 | 2/2005 | Tosey | |
| 2005/0235019 A1* | 10/2005 | Yang | H04L 29/06 |
| 2007/0271309 A1* | 11/2007 | Witriol | G06F 16/27 |
| 2009/0282125 A1* | 11/2009 | Jeide | H04L 67/1095 709/217 |
| 2010/0142522 A1* | 6/2010 | Gardner | H04L 69/26 370/389 |

(Continued)

FOREIGN PATENT DOCUMENTS

| | | |
|---|---|---|
| EP | 1672857 A1 | 6/2006 |
| WO | 2010048324 A1 | 4/2010 |

OTHER PUBLICATIONS

European Patent Application No. 17181293.6, Extended European Search Report dated Aug. 30, 2017.

*Primary Examiner* — Aleksandr Kerzhner
*Assistant Examiner* — Maher N Algibhah
(74) *Attorney, Agent, or Firm* — Borden Ladner Gervais LLP; Geoffrey deKleine

(57) ABSTRACT

A method of managing data transfer from a server to an electronic device via a wireless communication, includes initiating a synchronization of a database of the electronic device with the server and determining, by the electronic device, a length of time since the synchronization of the database of the electronic device with the server. The method also includes, in response to determining that the length of time meets the threshold period, determining a quantity of data records for sending from the server to the electronic device to perform a further synchronization and requesting one of complete data records or incomplete data records based on the quantity of data records for transfer to the electronic device.

14 Claims, 3 Drawing Sheets

(56) References Cited

U.S. PATENT DOCUMENTS

| | | | | |
|---|---|---|---|---|
| 2010/0154044 A1* | 6/2010 | Manku | ............... | H04L 67/327 |
| | | | | 726/7 |
| 2013/0339519 A1* | 12/2013 | Lientz | ............... | H04L 43/0888 |
| | | | | 709/224 |
| 2014/0247731 A1* | 9/2014 | Nagaraj | ............... | H04W 36/30 |
| | | | | 370/252 |
| 2015/0163647 A1* | 6/2015 | Lynn | ............... | H04W 4/14 |
| | | | | 455/466 |
| 2015/0208459 A1* | 7/2015 | Kitagawa | ............... | H04W 36/03 |
| | | | | 455/436 |
| 2016/0138492 A1* | 5/2016 | Levy | ............... | F02D 29/02 |
| | | | | 701/102 |
| 2017/0324795 A1* | 11/2017 | Ashida | ............... | H04L 47/30 |

* cited by examiner

ELECTRONIC DEVICE AND METHOD OF MANAGING DATA TRANSFER

FIELD OF TECHNOLOGY

The present disclosure relates to electronic devices and the synchronization of personal information manager application records for storage on electronic devices.

BACKGROUND

Electronic devices have gained widespread use and may provide a variety of functions. For example, portable electronic devices may be utilized for telephonic, electronic messaging and other personal information manager (PIM) application functions. Portable electronic devices include several types of devices including mobile stations such as simple cellular telephones, smart telephones, wireless PDAs, and laptop computers with wireless communication capabilities.

Portable electronic devices such as PDAs or smart telephones are generally intended for handheld use and ease of portability. Wireless network connections such as cellular network connections, are utilized in maintaining connectivity. Thus, a wireless network is utilized for data transmission, for example, to transmit data such as email and other data records to portable electronic devices.

The number of data records, such as messages received during any given period of time varies depending on a number of factors and the quantity of data records transmitted to maintain synchronized records at the electronic device may be significant.

Improvements in management of PIM service synchronization via wireless connections are desirable.

BRIEF DESCRIPTION OF THE DRAWINGS

Embodiments of the present disclosure will now be described, by way of example only, with reference to the attached figures.

DETAILED DESCRIPTION

Figure 1:
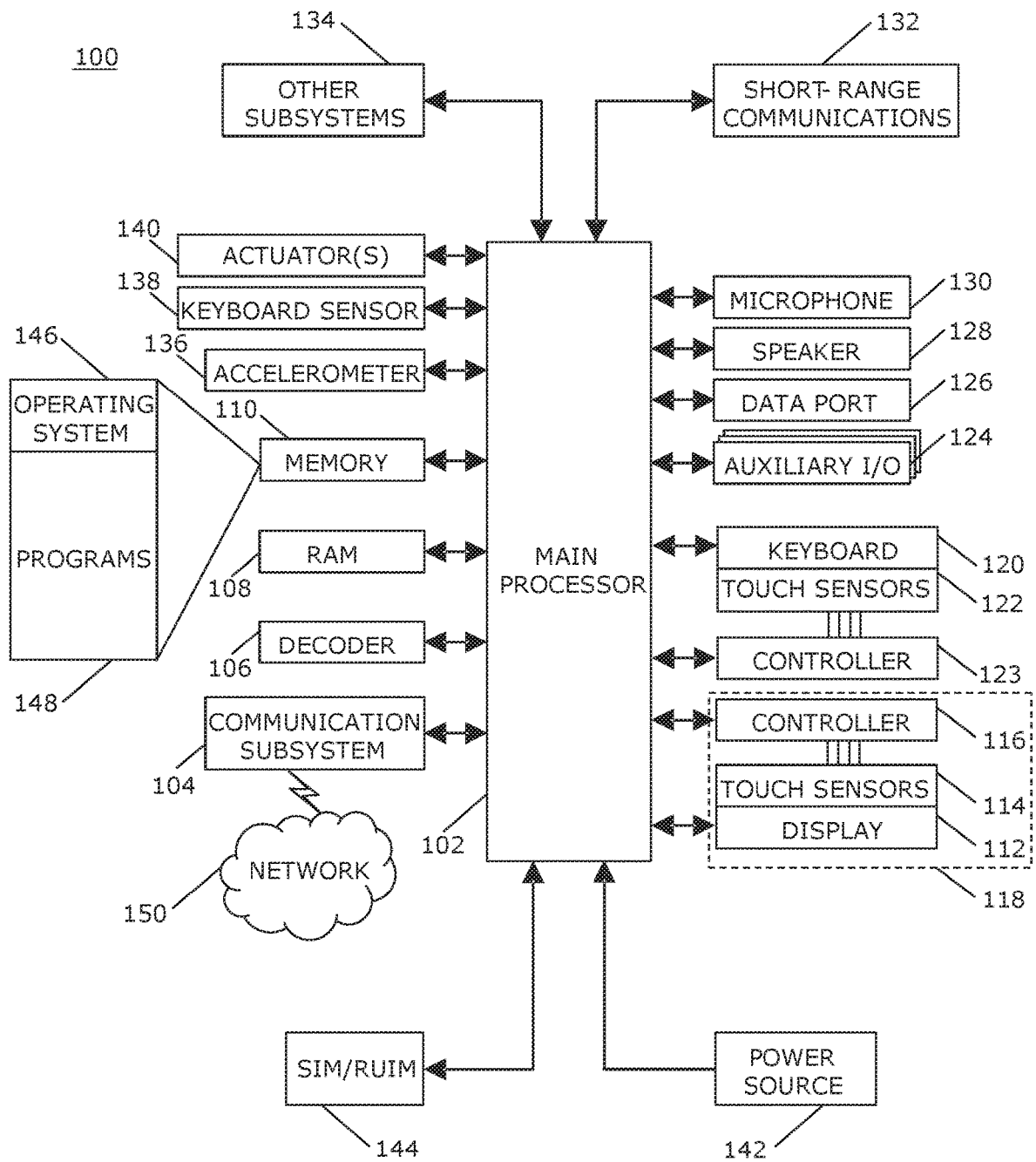
FIG. 1 is a block diagram of a portable electronic device in accordance with the present disclosure.

The following describes an electronic device and a method of managing data transfer from a server to the electronic device via a wireless communication. The method includes initiating synchronization of a database of the electronic device with the server and determining, by the electronic device, a length of time since the synchronization of the database of the electronic device with the server. The method also includes, in response to determining that the length of time meets the threshold period, determining a quantity of data records for sending from the server to the electronic device for further synchronization and requesting one of complete data records or incomplete data records based on the quantity of data records for transfer to the electronic device.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth.

A block diagram of an example of an electronic device 100 is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, a physical keyboard 120, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Thus, the touch sensors 114 and the controller 116 are utilized as an input device. Information, such as text, characters, symbols, images, icons, and other items that may be displayed or rendered on a portable electronic device, is displayed on the touch-sensitive display 118 via the processor 102. The keyboard may be, for example, a physical keyboard 120 that includes a plurality of mechanical keys that have mechanical switches or contacts for input to the electronic device 100 when a mechanical key of the keyboard is depressed by a sufficient force to oppose a bias of the mechanical key. In this example, touch sensors 122 are disposed on the physical keyboard 120 and the touch sensors 122 are coupled to a controller 123. Thus, in addition to depression of the mechanical keys of the physical keyboard 120 for input to the portable electronic device 100, touches on the mechanical keys are also detected for input to the processor 102.

The touch-sensitive display 118 is moveable relative to the physical keyboard 120, between the first position in which the physical keyboard is not exposed and the second position in which the physical keyboard 120 is exposed for use. A keyboard sensor 138 is utilized to detect a location of the touch-sensitive display 118 relative to the physical keyboard 120 of the electronic device 100.

The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 144 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display. A capacitive touch-sensitive display includes capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected. A tap, which is a particular type of touch may be a touch that ends within a threshold period of time. Thus, the touch contact with the touch-sensitive display 118 is relatively short because contact ends within a threshold period of time of beginning.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch sensors 122 on the physical keyboard 120 may be any suitable touch sensors, such as capacitive touch-sensors and may comprise any suitable material, such as indium tin oxide (ITO). Optionally, the touch sensors 122 disposed on the physical keyboard 120 may be coupled to the same controller 116 as the touch sensors of the touch-sensitive display 118 such that a single controller is utilized rather than two controllers 116, 123.

One or more touches on the keys of the keyboard 120 may be detected. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the keyboard 120. A touch may be detected from any suitable input member and multiple simultaneous touches may be detected.

One or more gestures may also be detected by the touch sensors 122 disposed on the keyboard 120. A gesture on the keys of the keyboard 120 may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover.

The touch-sensitive display 118 includes a display area in which information may be displayed, and a non-display area extending around the periphery of the display area. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image is displayed by the display 112 in the non-display area. Touch sensors may be disposed in the non-display area, which touch sensors may be extended from the touch sensors in the display area or distinct or separate touch sensors from the touch sensors in the display area. A touch on the touch-sensitive display 118, including a gesture, may be associated with the display area, the non-display area, or both areas. The touch sensors may extend across substantially the entire non-display area or may be disposed in only part of the non-display area.

Figure 2:
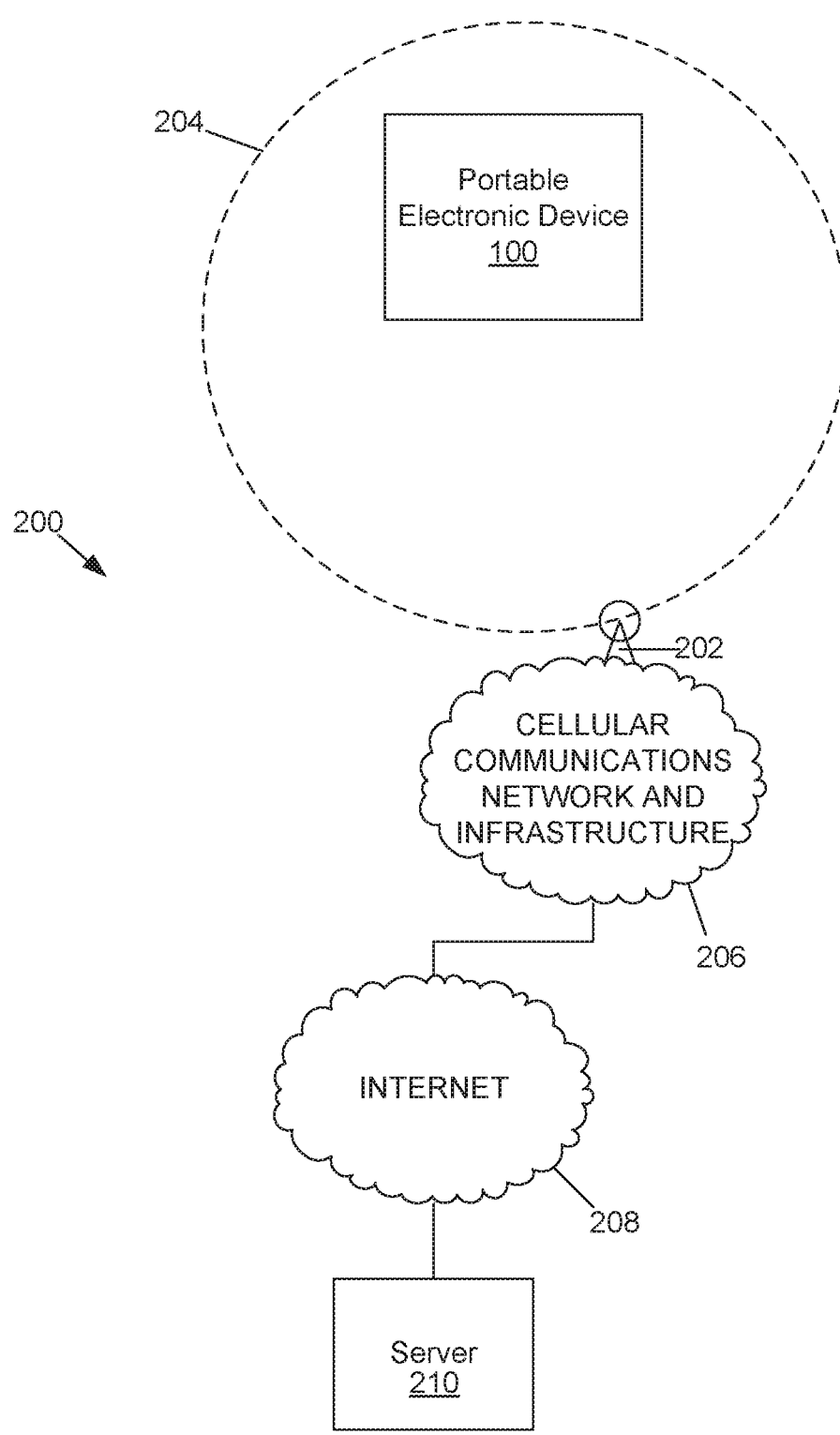
FIG. 2 is a functional block diagram of a portable electronic device in communication with a wireless communication system in accordance with the present disclosure.

A functional block diagram of one example of a wireless communication system in which the portable electronic device is utilized is shown in FIG. 2. In this example, the wireless communication system is a cellular communication system and is indicated generally by the numeral 200. The cellular communication system 200 provides for communications with portable electronic devices including the portable electronic device 100, as shown. The portable electronic device 100 and the communication system 200 are operable to effect communications over a radio communications channel in a cellular communications network. Data originating at the portable electronic device 100 is communicated to the communication system 200 by way of the radio communications channel. Similarly, data originating at the communication system 200 is communicated from the communication system 200 to the portable electronic device 100 by way of the radio communications channel, thereby providing data to the portable electronic device 100.

For the purpose of illustration, the communication system 200 is functionally represented in FIG. 2 and a single cellular base station 202 is shown. The cellular base station 202 defines a coverage area, or cell 204 within which communications between the cellular base station 202 and the portable electronic device 100 are effectuated. The portable electronic device 100 is movable within the cell 204 and may be moved to coverage areas defined by other cells that are not illustrated in the present example. The communication system 200 includes the cellular base station 202 that is part of a cellular communication network and infrastructure 206 that provides a communications link to the portable electronic device 100. The cellular wireless network and infrastructure 206 includes a plurality of cellular base stations (not shown) that provide the other cells referred to above. Data is delivered to the portable electronic device 100 via wireless transmission from the cellular base station 202. Similarly, data is sent from the portable electronic device 100 via wireless transmission to the cellular base station 202.

The cellular communication network and infrastructure includes, for example, a dual-mode wireless network that supports both voice and data communications over the same physical cellular base stations, including the base station 202. The cellular communication network and infrastructure 206 is operatively coupled to the Internet 208, which in this example is functionally coupled to an enterprise server 210.

The enterprise server 210 may be any suitable server to facilitate synchronization of Personal Information Manager (PIM) services including email, contacts, calendar events, and other data with a portable electronic device 100, such as the portable electronic device 100. For example, the enterprise server 210 may be a Microsoft Exchange™ server including Exchange ActiveSync™.

Thus, the server 210 facilitates synchronization of Personal Information Manager (PIM) services including email records, contacts, calendar event records, and other data from an enterprise or business with the portable electronic device 100. Alternatively, a personal PIM service may be maintained in association with an Internet server rather than an enterprise server.

Figure 3:
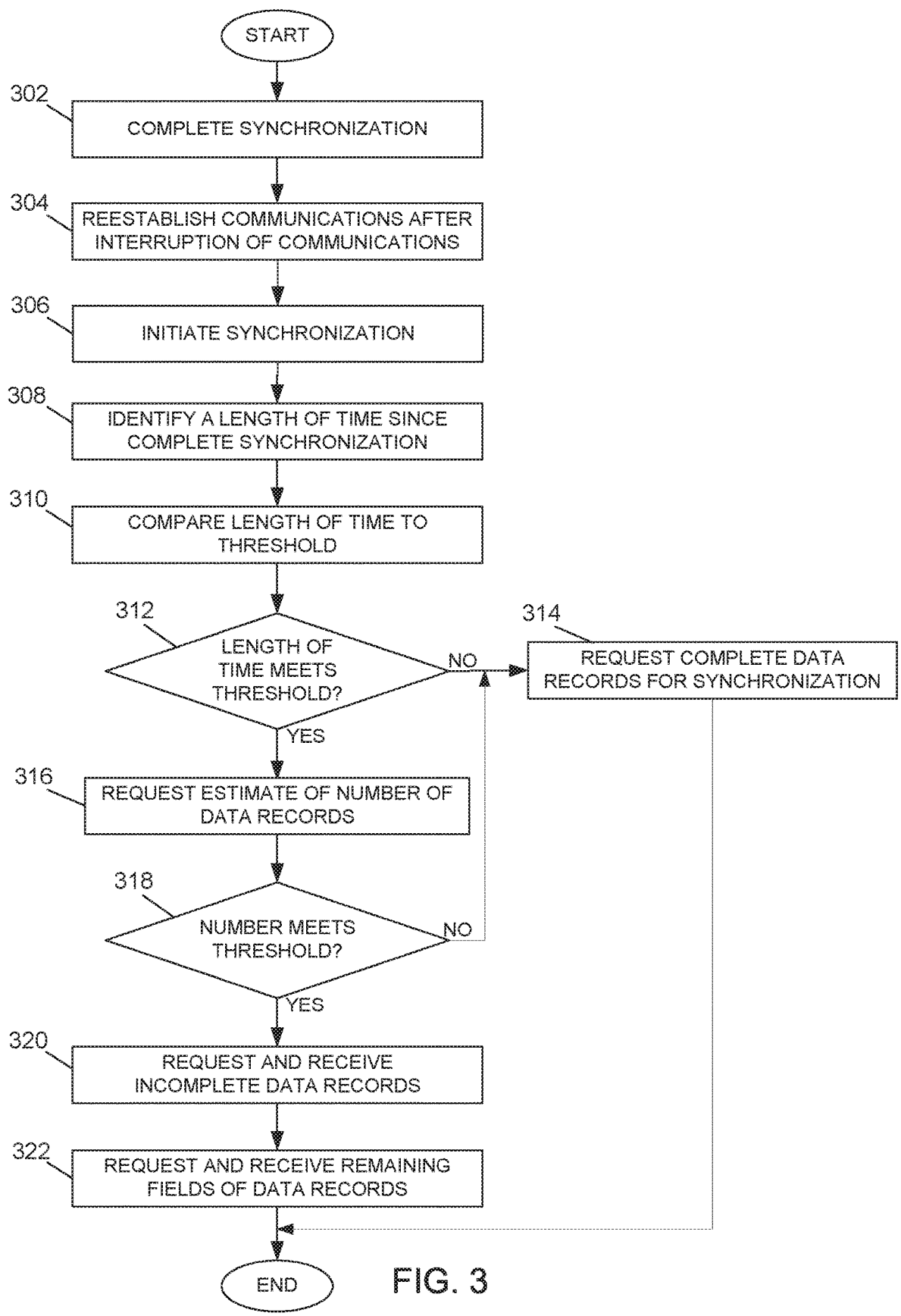
FIG. 3 is a flowchart illustrating a method of managing data transfer from a server to a portable electronic device via a wireless network in accordance with the present disclosure.

A flowchart illustrating a method of managing data transfer from a server, such as the enterprise server 210, to an electronic device, such as the portable electronic device 100 via a cellular network is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor 102 of the portable electronic device 100 to perform the method may be stored in a computer-readable storage medium, such as a non-transitory computer-readable medium.

The portable electronic device 100 completes a synchronization at 302 in which the PIM service records of a PIM service account are synchronized with the data records stored in memory at the portable electronic device 100. The synchronization may be initiated by the portable electronic device 100 at a regular time interval or in response to an input received at the portable electronic device 100. For example, the synchronization may be initiated by adding a personal information manager service account to the portable electronic device 100. When a personal information manager service account is added, data records, which may include calendar data records, email messages, contacts, or any other suitable data records, from the personal information manager service account are added to a database or other data storage, for example, in the memory 110 on the portable electronic device 100.

Wireless communications may be interrupted and later reestablished at 304. Wireless communications such as a cellular network connection, may be interrupted because no network connection is available or usable by the electronic device. For example, a cellular network connection may be reestablished when communications are enabled after being disabled for a period of time, when the portable electronic device 100 is powered on after being powered off for a period of time, or when the portable electronic device 100 enters an area covered by the cellular communications network after a period of time of being out of the coverage areas of the cellular communications network.

In response to reestablishing wireless communications, for example, via the wireless network, the portable electronic device 100 initiates further synchronization at 306. The portable electronic device 100, at 308, identifies a length of time since the last complete synchronization. The length of time may be very short, for example, as a result of restarting the portable electronic device 100, or may be long, for example, as a result of turning off wireless communications capabilities during a flight or as a result of travelling out of cellular communication range.

The length of time determined at 308 is compared to a threshold length of time at 310. The threshold may be any suitable length of time. For example, the threshold may be a few minutes or may be hours.

In response to determining that the length of time does not meet the threshold length of time at 312, the process continues at 314 and a complete synchronization is performed. To perform the complete synchronization, the portable electronic device 100 sends a request for the complete data records for synchronization. The portable electronic device 100 receives the complete data records including all fields of the data records to thereby synchronize the PIM service records of a PIM service account with the data records stored in memory at the portable electronic device 100. Thus, if the length of time during which wireless network communications were not enabled or available is relatively short, such as seconds or a few minutes, complete data records including all fields of the data records are requested by the portable electronic device 100.

In response to determining that the length of time does meet the threshold length of time at 312, the process continues at 316 and the portable electronic device 100 sends a request for an estimate of a number of data records at the server 210 for sending to the portable electronic device 100 to perform the synchronization. The number may be an estimate of the number of data records to be sent to the portable electronic device 100 as the number of data records may change during the synchronization process. For example, additional email messages may be received at the server 210 for synchronization after the server 210 provides the estimate of the number of data records.

The length of time may meet the threshold length of time when the length of time is equal to or exceeds the threshold. Alternatively, the length of time may meet the threshold length of time only when the length of time exceeds the threshold.

The estimated number of data records is received from the server 210 and compared to a threshold number. When the estimated number of data records does not meet the threshold number, the process continues at 314 and a complete synchronization is performed. As described above, the portable electronic device 100 sends a request for the complete data records for synchronization and receives the complete data records including all fields of the data records to thereby synchronize the PIM service records of a PIM service account with the data records stored in memory at the portable electronic device 100. Thus, if a small number of data records, for example, a few email messages are to be sent to the portable electronic device 100, the complete data records, including all fields of the data records and attachments, are requested and received at the portable electronic device 100.

When the estimated number of data records meets the threshold number at 318, the process continues at 320. The estimated number may meet the threshold when the estimated number is equal to or exceeds the threshold. Alternatively, the estimated number may meet the threshold only when the estimated number exceeds the threshold. The threshold may be a fixed number or may be varied. For example, the threshold may vary depending on the quality of the wireless connection. Data transmission utilizing a 3G, or $3^{rd}$ generation cellular network connection is significantly faster than data transmission utilizing a 2G cellular network connection. Similarly, a 4G cellular network connection is faster than data transmission utilizing a 3G cellular network connection. Data transmission utilizing a Wi-Fi connection is also faster than data transmission utilizing a 3G cellular network connection. Thus, the speed of transmission or download speed utilizing a 2G network connection is significantly slower than the download speed utilizing a 3G network connection, 4G network connection, or a Wi-Fi network connection. The threshold number may be lower when a 2G cellular network connection is detected compared to the threshold number when a 4G cellular network connection or Wi-fi connection is detected.

The portable electronic device 100 initiates a modified synchronization by sending a request to the server 210 for incomplete data records at 320, thereby requesting only partial data records. Thus, not all fields of the data records are requested by the electronic device 100 at 320. For email messages, for example, the portable electronic device 100 requests only the headers of the email messages. Thus, the identification information such as the sender, the time and date, and the subject are sent from the server 210 and received at the portable electronic device 100. The body of the email, however, is not requested by the portable electronic device 100 and is not sent by the server 210. In addition, any email attachments are not sent by the server at 320. Similarly, other PIM service records may also be incomplete. For example, calendar information such as a body and any calendar attachments to calendar events may be missing from calendar data records requested by and received at the portable electronic device 100.

After receipt of all of the incomplete data records at the portable electronic device 100, the portable electronic device requests the remaining fields that are missing from the data records stored on the portable electronic device 100 at 322. The portable electronic 100 may request the remaining fields in order of most recent to oldest data record. For example, the body of the email messages most recently received at the server 210 for synchronizing with the portable electronic device 100 may be sent first to complete the most recent email messages before completing the oldest email messages. Thus, the body of more recent email messages may be viewed by the user before older email messages. Alternatively, the portable electronic device may request and receive the body of email messages that are marked important or urgent first.

In addition, data record attachments are requested. The data record attachments may be requested along with the body of the data records or may be requested after completing the remaining fields of the data records.

One example of a method of managing data transfer from a server, such as the enterprise server 210, to a portable electronic device, such as the portable electronic device 100, via a cellular network is described with continued reference to FIG. 2 and FIG. 3.

The portable electronic device 100 performs and completes synchronization of email messages from an email account managed at the enterprise server 210 at 302. The portable electronic device 100 then exits the coverage area of the cellular communications network. For the purpose of this example, the portable electronic device 100 is out of cellular communications range for three days. Cellular network communications are reestablished at 304 when the portable electronic device 100 enters cellular range again. The portable electronic device 100 initiates synchronization at 306 to synchronize email messages in the database at the portable electronic device with the email messages of the email account managed at the enterprise server 210.

The portable electronic device 100 determines that the previous synchronization was completed more than three days earlier at 308 and compares the length of time to a threshold at 310. The threshold length of time in this example is 1 hour. Thus, the portable electronic device 100 determines at 312 that the length of time meets the threshold and, at 316, requests, from the server 210, the estimated number of email messages to be sent to the portable electronic device 100 in order to synchronize the email messages at the portable electronic device 100 with the email messages at the email account managed at the enterprise server 210.

The enterprise server provides the estimated number of email messages to the portable electronic device 100 and the portable electronic device 100 compares the number to the threshold number at 318. For the purpose of this example, the estimated number of email messages is 600 and the threshold number is 20. Thus, the estimated number meets the threshold at 318 and the portable electronic device 100 utilizes a modified synchronization by requesting and receiving only the header field information for each email message at 320. Thus, the header field information is sent by the server 210 and received at the portable electronic device 100. The body of the emails, however, is missing from the data records received at the portable electronic device.

After receiving the email header for each of the email messages, the portable electronic device 100 may request the body and attachments, if any, for each of the messages in order beginning with most recent email message received at the server 210.

Advantageously, only data record identification information such as email headers are requested and received at the portable electronic device when a large volume of data is to be transferred to synchronize PIM service records managed by a server with databases at an electronic device. Additional data fields, such as the body of email messages or calendar events and data record attachments are not sent until after the data record identification information for all data records is received at the portable electronic device 100. Thus, a list of received email messages may be displayed prior to receipt of the email message bodies, facilitating perusal of the list of emails, for example, to identify most recent email messages in a chain of messages.

The scope of the claims should not be limited by the embodiments set forth in the examples, but should be given the broadest interpretation consistent with the description as a whole.

What is claimed is:

1. A method of managing data transfer from a server to an electronic device via a wireless communication, the method comprising:
   initiating a synchronization of a database of the electronic device with the server;
   determining, by the electronic device, a length of time since a previous synchronization of the database of the electronic device with the server;
   in response to determining that the length of time meets a threshold period of time:
      determining a quantity of data records for sending from the server to the electronic device to perform a further synchronization;
      determining a threshold number of data records based on a quality of a wireless communication connection such that the threshold number varies based on the quality of the wireless communication connection and the threshold number is lower for a slower download speed compared to the threshold number for a higher download speed;
      in response to determining that the quantity of data records for sending from the server to the electronic device exceeds the threshold number, requesting, by the electronic device, incomplete data records from the server, wherein the incomplete data records include less than all fields of the data records for transfer to the electronic device such that one or more fields of each of the data records for sending are not requested by the electronic device and are not received at the electronic device and at least one other field of each of the data records for sending is requested and is received at the electronic device;
      in response to determining that the quantity of data records for sending from the server to the electronic device is less than the threshold number, requesting complete data records from the server, wherein the complete data records include all fields of the data records for transfer to the electronic device.

2. The method according to claim 1, wherein determining, by the electronic device, a length of time is performed in response to re-establishing wireless communications after disconnecting the wireless communications.

3. The method according to claim 1, wherein requesting, by the electronic device, the incomplete data records comprises requesting headers of the data records.

4. The method according to claim 1, comprising receiving the incomplete data records at the electronic device.

5. The method according to claim 4, wherein receiving the incomplete data records comprises receiving headers of the incomplete data records and not receiving bodies of the incomplete data records.

6. The method according to claim 5, wherein the incomplete data records are absent any data record attachments.

7. The method according to claim 4, comprising, after receipt of the incomplete data records, requesting remaining fields of the data records to complete the data records and receiving the remaining fields of the data records.

8. The method according to claim 7, comprising, in addition to receiving the remaining fields of the data records, receiving data record attachments to complete the data records.

9. A non-transitory computer-readable medium having computer-readable code stored thereon, the computer-readable code executable by at least one processor of a portable electronic device to perform the method according to claim 1.

10. An electronic device comprising:
    a memory for data storage;
    a display for displaying information thereon;
    an input device; and
    a communications subsystem for receiving data from a server and sending data from the electronic device; and
    a processor operably coupled to the memory, the display, the input device;
    and the communications subsystem, and configured to:
       initiate a synchronization of a database stored in memory of the electronic device;
       determine, by the electronic device, a length of time since a previous synchronization of the database of the electronic device with the server;
       in response to determining that the length of time meets a threshold period of time:
          determine a quantity of data records for sending from the server to the electronic device to perform a further synchronization;
          determine a threshold number of data records based on a quality of a wireless communication connection such that the threshold number varies based on the quality of the wireless communication connection and the threshold number is lower for a slower download speed compared to the threshold number for a higher download speed;
          in response to determining that the quantity of data records for sending from the server to the electronic device exceeds the threshold number, request incomplete data records from the server, wherein the incomplete data records include less than all fields of the data records for transfer to the electronic device such that one or more fields of each of the data records for sending are not requested by the electronic device and are not received at the electronic device and at least one other field of each of the data records for sending is requested and is received at the electronic device; and
          in response to determining that the quantity of data records for sending from the server to the electronic device is less than the threshold number, request complete data records or for transfer to the electronic device.

11. The electronic device according to claim 10, wherein the length of time is determined in response to re-establishing wireless communications after the wireless communications are disconnected.

12. The electronic device according to claim 10, wherein the incomplete data records include headers of the data records and no body.

13. The electronic device according to claim 10, wherein the incomplete data records are absent any data record attachments.

14. The electronic device according to claim 10, wherein the processor is configured to request missing fields to complete the incomplete data records after receipt of the incomplete data records.

* * * * *